Patented July 15, 1941

2,249,498

UNITED STATES PATENT OFFICE 2,249,498

COATING COMPOSITION

Walter Schulze, Neue Muhle - Konigswusterhausen, Germany, assignor to General Electric Company, a corporation of New York No Drawing. Application February 23, 1939, Serial No. 258,099. In Germany February 28, 1938

4 Claims. (Cl. 260—83)

The present invention relates broadly to coating compositions. It is directed more particularly to certain improvements in liquid coating compositions, specifically wire or baking enamels, having a resinous base consisting essentially of polymerized or polymeric (as distinguished from monomeric) "acrylic compound," within the meaning of which term is intended to be included polymerized acrylic acid, polymerized homologues of acrylic acid, and polymerized derivatives of acrylic acid and its homologues.

In the co-pending application of Georg Pohler, Serial No. 159,974, filed August 19, 1937, now Patent 2,191,584, issued February 27, 1940 and assigned to the same assignee as the present invention is disclosed and claimed a liquid composition for coating wires and the like, which composition comprises a volatile solvent and the residue of heating to incipient decomposition, but not materially thereabove, a polymerized acrylic compound. An insulated electrical conductor and electrical insulation comprising the aforesaid residue, as well as method features, are also disclosed and claimed in this Pohler application. As described in the Pohler case, the specified heat treatment may be applied to the resinous material before it is incorporated into a liquid coating composition. Or, an article, for example a wire, which is coated with the composition, may be heated sufficiently high to produce the desired change in the chemical, physical and electrical characteristics of the applied coating.

In certain cases, as for instance when the foundation material bearing the resinous coating is detrimentally affected by exposure to elevated temperatures, it is often undesirable or impractical to heat the coated articles to the temperatures heretofore required to improve the properties of the acrylic coating material.

I have discovered that the above difficulties can be obviated and lower heat-treating or baking temperatures can be employed, with resultant savings in fuel costs, by incorporating with the polymerized acrylic compound a relatively small amount generally not exceeding substantially 5 per cent by weight thereof of an oxygen-evolving substance such as an organic peroxide, for example, benzoyl peroxide.

While it has been known heretofore that monomeric acrylic compounds can be converted into polymeric compounds by adding thereto an aromatic peroxide, e. g., benzoyl peroxide, or other oxygen-evolving substances, so far as I know it has not been known previously that such substances would beneficially affect the properties, particularly the electrical properties, of polymerized acrylic compounds. As a result of this discovery, wires and other articles coated with a composition comprising a volatile solvent and a polymerized acrylic compound having incorporated therewith an oxygen-evolving substance, specifically benzoyl peroxide, require heating only to relatively low temperatures, for example within the temperature range of approximately 100° C. to approximately 200° C. to improve their physical and electrical properties. The coated wires have approximately the same physical and electrical characteristics as obtained by heating the applied coating to incipient decomposition in the manner described in the aforesaid Pohler application.

Instead of heating the coated article as above described, alternatively the polymerized acrylic compound containing the oxygen-evolving substance may be suitably heated, for example, within the range of 100° to 200° C. The resulting product is dissolved in a suitable volatile solvent to form a liquid coating composition. A wire or other article coated with this composition requires heating only sufficiently to volatilize the solvent.

The following table shows the comparative results obtained between an unmodified polyacrylate coating composition and the same composition containing 1, 3 and 5 per cent benzoyl peroxide, respectively, in each case after a heat-treatment of the varnish film at 120° C. for 30 minutes.

Table

| Coating material | Loss-factor measurement at 800 cycles | Color of baked film |
|---|---|---|
| Polyacrylate composition without any special admixture. | $190.10^{-4}$ | Colorless. |
| Polyacrylate composition with 1% benzoyl peroxide. | $146.10^{-4}$ | Light brown. |
| Same, with 3% benzoyl peroxide | $128.10^{-4}$ | Brown. |
| Same, with 5% benzoyl peroxide | $88.10^{-4}$ | Dark brown. |

As shown by the foregoing table, the loss angle decreases materially for the same conditions of heat treatment with an increase in the amount of added benzoyl peroxide.

The present invention provides an effective and economical method for improving the physical and electrical properties of acrylic compounds, more specific examples of which are methyl, ethyl, propyl, butyl polyacrylates and polymethacrylates and polymerized acrylonitrile.

It is particularly applicable to the production of wire or baking enamels comprising a volatile solvent and a resinous base consisting substantially of one or another of the following acrylic compounds: polymerized methyl acrylate; polymerized ethyl acrylate; polymerized acrylonitrile; separately or conjointly polymerized mixtures of methyl and ethyl esters of acrylic acid; and separately or conjointly polymerized mixtures of either or both of these esters with acrylonitrile.

I prefer to use as the acrylic component of my coating compositions a mixture consisting substantially of, by weight, at least 10 per cent and not exceeding substantially 65 per cent polymerized acrylonitrile and the remainder polymerized ester (or esters) of acrylic acid, preferably the ethyl ester of acrylic acid. Any suitable organic solvents or solvent mixtures may be used in forming liquid coating compositions from the modified acrylic compound.

The present invention is separate and distinct from the invention disclosed and claimed in the co-pending application of Carlos Tobis, Serial No. 159,973, filed August 19, 1937, now Patent No. 2,167,537, and assigned to the same assignee as the present invention. In that application is claimed a baking enamel comprising a mixture of polymerized ester of acrylic acid and polymerized acrylonitrile, and a particular organic solvent, viz., a mixture of diethylene dioxide, monochlorbenzene, cyclohexanone, dichlor-diethyl ether and ethylene glycol diacetate.

The present invention also is separate and distinct from the invention disclosed and claimed in the copending application of Paul Nowak, Hermann Hofmeier, and Carlos Tobis, Serial No. 159,972, filed August 19, 1937, now Patent 2,191,580 issued February 27, 1940, and assigned to the assignee as the present invention. This Nowak et al. application differs from the hereinbefore mentioned Pohler application Serial No. 159,974 in that it is directed to the production of electrical insulation comprising the incipient decomposition product of mixed polymerizate of acrylic ester and acrylonitrile, and to conductors insulated with such insulation. In practicing the present invention the acrylic compound is not heated to incipient decomposition.

What I claim as new and desire to secure by Letters Patent of the United States is:

1. The method of preparing a liquid coating composition which consists of the steps of incorporating a small amount of an organic peroxide into a polymerized acrylic compound, heating the resulting product and dissolving the heated product in a volatile solvent therefor to form a liquid mass.

2. A method as in claim 1 wherein the organic peroxide is benzoyl peroxide.

3. A method as in claim 1 wherein the polymerized acrylic compound consists of a mixture of a polymerized ester of acrylic acid and polymerized acrylonitrile.

4. The method of preparing a liquid coating composition which consists of the steps of incorporating a small amount of benzoyl peroxide into a resinous base consisting of, by weight, at least 10 per cent and not exceeding substantially 65 per cent polymerized acrylonitrile and the remainder polymerized ester of acrylic acid, heating the resulting product within the range of 100° to 200° C. and dissolving the thus heated product in a volatile solvent therefor to form a liquid mass.

WALTER SCHULZE.